(12) United States Patent
Erceg et al.

(10) Patent No.: US 8,761,752 B2
(45) Date of Patent: *Jun. 24, 2014

(54) METHOD AND SYSTEM FOR DYNAMIC ADJUSTMENT OF POWER AND FREQUENCIES IN A FEMTOCELL NETWORK

(71) Applicant: Broadcom Corporation, Irvine, CA (US)

(72) Inventors: Vinko Erceg, Cardiff, CA (US); Charles Abraham, Los Gatos, CA (US); Xuemin Chen, Rancho Santa Fe, CA (US); Wael William Diab, San Francisco, CA (US); Victor Hou, La Jolla, CA (US); Jeyhan Karaoguz, Irvine, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/890,006

(22) Filed: May 8, 2013

(65) Prior Publication Data

US 2013/0252598 A1    Sep. 26, 2013

Related U.S. Application Data

(63) Continuation of application No. 13/483,991, filed on May 30, 2012, now Pat. No. 8,504,044, which is a continuation of application No. 12/415,826, filed on Mar. 31, 2009, now Pat. No. 8,213,937.

(51) Int. Cl.
*H04W 16/28* (2009.01)

(52) U.S. Cl.
USPC ........ 455/418; 455/436; 455/434; 455/422.1; 455/456.1; 455/435.1

(58) Field of Classification Search
USPC ......... 455/418, 436, 422.1, 456.1, 435.1, 434
See application file for complete search history.

(56) References Cited

U.S. PATENT DOCUMENTS

| | | | |
|---|---|---|---|
| 7,120,431 B1 | 10/2006 | Huo et al. | |
| 7,245,938 B2 | 7/2007 | Sobczak et al. | |
| 8,111,655 B2 | 2/2012 | Hui | |
| 8,175,607 B2 | 5/2012 | Engstrom | |
| 8,213,937 B2 | 7/2012 | Erceg et al. | |
| 2006/0023648 A1* | 2/2006 | Amos | 370/310 |
| 2007/0097939 A1 | 5/2007 | Nylander et al. | |

(Continued)

*Primary Examiner* — Meless Zewdu
*Assistant Examiner* — Jean Chang
(74) *Attorney, Agent, or Firm* — Sterne, Kessler, Goldstein & Fox P.L.L.C.

(57) ABSTRACT

Aspects of a method and system for dynamic adjustment of power, antenna direction and frequencies in a femtocell network are provided. In this regard, a communication system may comprise a plurality of femtocells, one or more base stations, and a femtocell management entity that coordinates operation of the plurality of femtocells. One or more parameters may be communicated from one of the plurality of femtocells and/or one or more base stations to the femtocell management entity. The femtocell management entity may be enabled to utilize the one or more parameters to determine configuration information for one of the plurality of femtocells and/or for one or more remaining ones of the plurality of femtocells. One of the plurality of femtocells may be enabled to receive the determined configuration information from the femtocell management entity. One of the plurality of femtocells may be configured utilizing the received determined configuration information.

20 Claims, 7 Drawing Sheets

(56) References Cited

U.S. PATENT DOCUMENTS

| | | | |
|---|---|---|---|
| 2009/0286544 A1* | 11/2009 | Huber et al. | 455/450 |
| 2010/0027694 A1* | 2/2010 | Touboul et al. | 375/260 |
| 2010/0041364 A1 | 2/2010 | Lott et al. | |
| 2010/0056132 A1 | 3/2010 | Gallagher | |
| 2010/0118844 A1* | 5/2010 | Jiao et al. | 370/338 |
| 2010/0167728 A1* | 7/2010 | Venkitaraman et al. | 455/434 |
| 2012/0238280 A1 | 9/2012 | Erceg et al. | |

* cited by examiner

| Registry | | | | | | |
|---|---|---|---|---|---|---|
| 336 Name / Description | 338 Femtocell ID | 340 GNSS coordinates | 342 Distance | 344 Antenna Direction | 346 Potential interference | 348 Power level |
| xxxxxxxxxxx | xxxxxxxx | N:dd mm.sss W:dd mm.sss | x.xx meters | xxxxxxxx | xxxxxxxx | xxxxxxxx |
| xxxxxxxxxxx | xxxxxxxx | N:dd mm.sss W:dd mm.sss | x.xx meters | xxxxxxxx | xxxxxxxx | xxxxxxxx |
| xxxxxxxxxxx | xxxxxxxx | N:dd mm.sss W:dd mm.sss | x.xx meters | xxxxxxxx | xxxxxxxx | xxxxxxxx |

METHOD AND SYSTEM FOR DYNAMIC ADJUSTMENT OF POWER AND FREQUENCIES IN A FEMTOCELL NETWORK

FIELD OF THE INVENTION

Certain embodiments of the invention relate to communications. More specifically, certain embodiments of the invention relate to a method and system for dynamic adjustment of power, antenna direction and frequencies in a femtocell network.

BACKGROUND OF THE INVENTION

A femtocell is a small base station that may be placed in a customer's residence or in a small business environment, for example. Femtocells may be utilized for off-loading macro radio network facilities, improving coverage locally in a cost-effective manner, and/or implementing home-zone services to increase revenue. Femtocells, like macro base stations, may be enabled to connect "standard" phones to a cellular provider's network by a physical broadband connection which may be a digital subscriber line (DSL) connection, fiber connection, and/or a cable connection, for example. Since the traffic between a customer's premises femtocell equipment and the operator's network may be traversing a public network, the traffic may be prone to various risks.

Communication between femtocells and one or more cellular provider's networks enables operation in private and public areas. The capacity of a femtocell may be adequate to address a typical family use model supporting two to four simultaneous voice calls and/or data, for example.

An important characteristic of femtocells is their ability to control access. In an open access scenario, any terminal and/or subscriber that may be subscribed to any cellular base station may be allowed to communicate with the femtocell. Accordingly, the femtocell usage may somewhat resemble that of a macrocellular system. In a closed access scenario, only a limited number of terminals and/or subscribers that may be subscribed to a given cellular base station may be allowed to communicate with the femtocell. In this regard, the cellular base station may be perceived as being deployed for private usage.

A regulatory issue with regard to femtocells is that they use licensed frequencies that radiate at a very low power in a controlled environment. It may be likely that they may not require a license from a local authority, as macrocellular base stations do. An additional regulatory issue may arise from the relationship between a femtocell operator and a broadband services operator. One possible scenario may include the broadband operator being unaware of the existence of a femtocell operator. Conversely, the broadband operator and femtocell operator may have an agreement or they may be the same operator, for example. Interference between femtocells may be an issue for femtocell deployments based on wideband technologies such as WCDMA, or OFDM, for example, because initial operator deployments may use the same frequency for both the femtocell and the macrocellular networks or due to the proximity of femtocell base stations in dense urban areas There are a plurality of design models for deployment and integration of femtocells, for example, an IP based radio network controller (RNC) node B (lu-b) interface, a session initiation protocol (SIP) based approach using an lu/A interface, use of unlicensed spectrum in a technique known as unlicensed mobile access (UMA) and/or use of IP multimedia subsystem (IMS) voice call continuity (VCC), for example.

In an lu-b model based femtocell deployment approach, femtocells may be fully integrated into the wireless carrier's network and may be treated like any other remote node in a network. The lu-b protocol may have a plurality of responsibilities, such as the management of common channels, common resources, and radio links along with configuration management, including cell configuration management, measurement handling and control, time division duplex (TDD) synchronization, and/or error reporting, for example. In lu-b configurations, mobile devices may access the network and its services via the Node B link, and femtocells may be treated as traditional base stations.

In a SIP based femtocell deployment approach, a SIP client, embedded in the femtocell may be enabled to utilize SIP to communicate with the SIP-enabled mobile switching center (MSC). The MSC may perform the operational translation between the IP SIP network and the traditional mobile network, for example.

In a UMA based femtocell deployment approach, a generic access network (GAN) may offer an alternative way to access GSM and GPRS core network services over broadband. To support this approach, a UMA Network Controller (UNC) and protocols that guarantee secure transport of signaling and user traffic over IP may be utilized. The UNC may be enabled to interface into a core network via existing 3GPP interfaces, for example, to support core network integration of femtocell based services by delivering a standards based, scalable IP interface for mobile core networks.

In an IMS VCC based femtocell deployment approach, VCC may provide for a network design that may extend an IMS network to include cellular coverage and address the handoff process. The IMS VCC may be designed to provide seamless call continuity between cellular networks and any network that supports VoIP, for example. The VCC may also provide for interoperability between GSM, UMTS, and CDMA cellular networks and any IP capable wireless access network, for example. The IMS VCC may also support the use of a single phone number or SIP identity and may offer a broad collection of functional advantages, for example, support for multiple markets and market segments, provisioning of enhanced IMS multimedia services, including greater service personalization and control, seamless handoff between circuit-switched and IMS networks, and/or access to services from any IP device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for dynamic adjustment of power, antenna direction and frequencies in a femtocell network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3 is a diagram illustrating an exemplary registry in a femtocell management entity, in accordance with an embodiment of the invention.

DETAILED DESCRIPTION OF THE INVENTION

Certain embodiments of the invention may be found in a method and system for dynamic adjustment of power, antenna direction and frequencies in a femtocell network. In various embodiments of the invention, a communication system may comprise a plurality of femtocells and a femtocell management entity that coordinates operation of the plurality of femtocells. One or more parameters may be communicated from one of the plurality of femtocells to the femtocell management entity. The femtocell management entity may be enabled to utilize the one or more parameters to determine configuration information for one of the plurality of femtocells and/or for one or more remaining ones of the plurality of femtocells. One of the plurality of femtocells may be enabled to receive the determined configuration information from the femtocell management entity. One of the plurality of femtocells may be configured utilizing the received determined configuration information for one of the plurality of femtocells.

In accordance with another embodiment of the invention, one or more femtocell management entities may be combined to form a management entity. The one or more parameters may be communicated from one of the plurality of femtocells to the management entity. The management entity may be enabled to utilize the one or more parameters to determine configuration information for one of the plurality of femtocells and/or for one or more remaining ones of the plurality of femtocells. In accordance with another embodiment of the invention, one or more femtocells may function as a management entity. The one or more parameters may be communicated from one of the other of the plurality of femtocells to the femtocell functioning as a management entity. The femtocell functioning as a management entity may be enabled to utilize the one or more parameters to determine configuration information for one of the other of the plurality of femtocells and/or for one or more remaining ones of the plurality of femtocells.

Figure 1A:
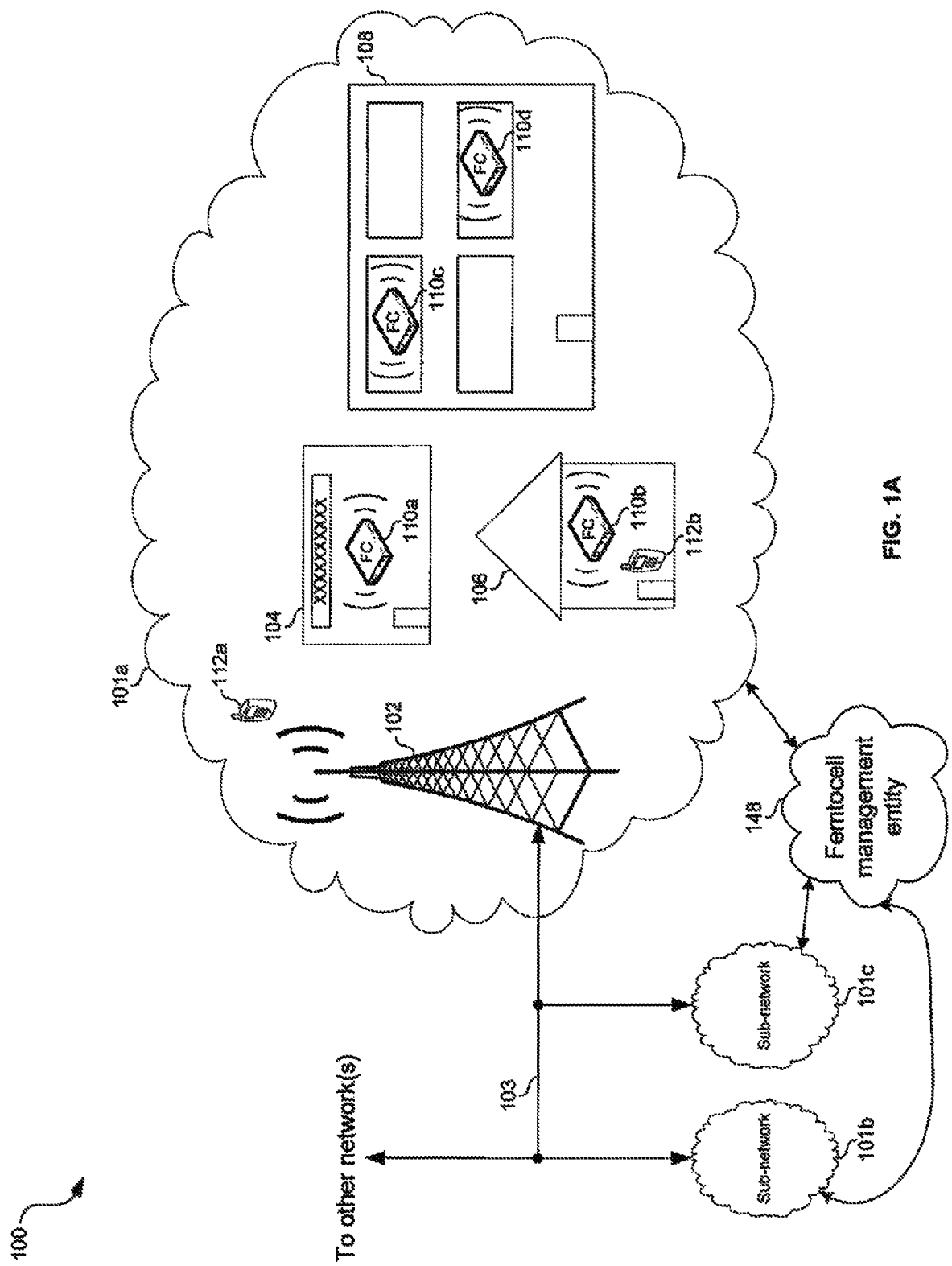
FIG. 1A is a diagram illustrating dynamic adjustment of power, antenna direction and frequencies in a femtocell network, in accordance with an embodiment of the invention.

FIG. 1A is a diagram illustrating dynamic adjustment of power, antenna direction and frequencies in a femtocell network, in accordance with an embodiment of the invention. Referring to FIG. 1A, there is shown a cellular network 100 comprising cellular sub-networks 101a, 101b and 101c, and a femtocell management entity 148. The exemplary cellular sub-network 101a may comprise a base station 102, a plurality of installed femtocells 110a, 110c and 110d, which are collectively referred to herein as femtocells 110, and a femtocell 110b that needs to be installed, cellular enabled communication devices 112a and 112b, which are collectively referred to herein as cellular enabled communication devices 112. The femtocells 110 may be installed in one or more commercial properties 104, one or more residential properties 106, and/or one or more multi-tenant properties 108.

The commercial properties 104 may comprise, for example, stores, restaurants, offices, and municipal buildings. The residential properties 106 may comprise, for example, single-family homes, home offices, and/or town-houses. Multi-tenant properties 108 may comprise residential and/or commercial tenants such as apartments, condos, hotels, and/or high rises.

The base station 102 may be operable to communicate data wirelessly utilizing one or more cellular standards such as IS-95, CDMA, GSM, TDMA, GPRS, EDGE, UMTS/WCDMA, TD-SCDMA, OFDM, HSDPA, extensions thereto, and/or variants thereof. Notwithstanding, the invention may not be so limited, and the base station 102 may be operable to communicate data to the plurality of femtocells via a wired network, for example, a digital subscriber line (DSL) connection, fiber connection, and/or a cable connection without limiting the scope of the invention. "Data," as utilized herein, may refer to any analog and/or digital information including but not limited to voice, Internet data, and/or multimedia content. Multimedia content may comprise audio and/or visual content comprising, video, still images, animated images, and/or textual content. The base station 102 may communicate with cellular enabled communication devices such as the cellular enabled communication devices 112. Exemplary cellular standards supported by the base station 102 may be specified in the International Mobile Telecomunnications-2000 (IMT-2000) standard and/or developed by the $3^{rd}$ generation partnership project (3GPP) and/or the $3^{rd}$ generation partnership project 2 (3GPP2). The base station 102 may communicate data amongst the various components of the sub-network 101a. Additionally, data communicated to and/or from the base station 102 may be communicated to sub-network 101b, sub-network 101c, and/or to one or more other networks (not shown) via one or more backhaul links 103. In this manner, data communicated to and/or from the base station 102 may be communicated to and/or from, other portions of the network 100 and/or other networks. Exemplary networks with which data may be communicated may comprise public switched telephone networks (PSTN) and/or IP networks such as the Internet or an Intranet.

The femtocell management entity 148 may comprise suitable logic, circuitry, and/or code for managing operating parameters of one more installed femtocells 110. The femtocells 110 may each comprise suitable logic, circuitry, and/or code that may be operable to communicate wirelessly utilizing one or more cellular standards such as IS-95, CDMA, GSM, TDMA, GPRS, EDGE, UMTS/WCDMA, TD-SCDMA, OFDM, HSDPA, extensions thereto, and/or variants thereof. In this regard, the femtocells 110 may each communicate with cellular enabled communication devices such as the cellular enabled communication devices 112. Exemplary cellular standards supported by the femtocells 110 may be specified in the International Mobile Telecommunications-2000 (IMT-2000) standard and/or developed by the $3^{rd}$ generation partnership project (3GPP) and/or the $3^{rd}$ generation partnership project 2 (3GPP2). Additionally, the femtocells 110 may each comprise suitable logic, circuitry, and/or code that may be operable to communicate over an IP network (not shown in FIG. 1A).

The cellular enabled communication devices 112 may each comprise suitable logic, circuitry, and/or code that may be operable to communicate utilizing one or more cellular standards. In this regard, the cellular enabled communication devices 112 may each be operable to transmit and/or receive data via the cellular network 100. Exemplary cellular enabled communication devices may comprise laptop computers, mobile phones, and personal media players, for example. The cellular enabled communication devices 112 may be enabled to receive, process, and present multimedia content and may additionally be enabled run a network browser or other applications for providing Internet services to a user of the cellular enabled device 112.

The cellular enabled communication devices 112 may gain access to the cellular network 100 and/or to other communication networks via cellular communications with the base station 102 and/or the femtocells 110. In this regard, in instances that a reliable connection may be established between the base station 102 and a cellular enabled communication device 112, the data may be communicated between the cellular enabled communication device 112 and the base station 102. Alternatively, in instances that a reliable connection may be established between a femtocell 110 and a cellular enabled communication device 112, data may be communicated between the cellular enabled communication device 112 and the femtocell 110.

In this regard, access by a cellular enabled communication device to a femtocell may comprise an ability of the cellular enabled communication device 112 to establish one or more cellular communication channels with the femtocell. The cellular communication channels between the cellular enabled communication device 112 and the femtocell 110 may enable the cellular enabled communication device 112 to exchange data with, for example, other cellular enabled communication devices, landline telephones, and/or network nodes such as fileservers, which may be communicatively coupled to a local area network and/or the Internet. Accordingly, the femtocells 110 may extend the overall cellular coverage area in the sub-network 101*a*. In particular, the femtocells 110 may extend or improve cellular coverage indoors or locations out of range of a base-station.

In operation, the femtocell management entity 148 may be operable to receive one or more parameters, for example, potential interference, power levels, and/or directionality of antennas from the plurality of installed femtocells and the plurality of cellular enabled communication devices from each cellular sub-network. For example, the femtocell management entity 148 may be operable to receive one or more parameters from the plurality of installed femtocells 110*a*, 110*c* and 110*d* and the plurality of cellular enabled communication devices 112*a* and 112*b* from the cellular sub-network 101*a*.

In accordance with an embodiment of the invention, subsequent to installation of the femtocell 110*b*, the femtocell 110*b* may be operable to receive one or more parameters from the one or more installed femtocells, for example, femtocells 110*a*, 110*c* and 110*d*, base station 102 and the plurality of cellular enabled communication devices 112*a* and 112*b* from the cellular sub-network 101*a*. The femtocell 110*b* may be operable to dynamically adjust one or more parameters, for example, power levels, frequencies of operation, and/or directionality of antennas of the femtocell 110*b* based on receiving configuration information from the femtocell management entity 148.

Figure 1B:
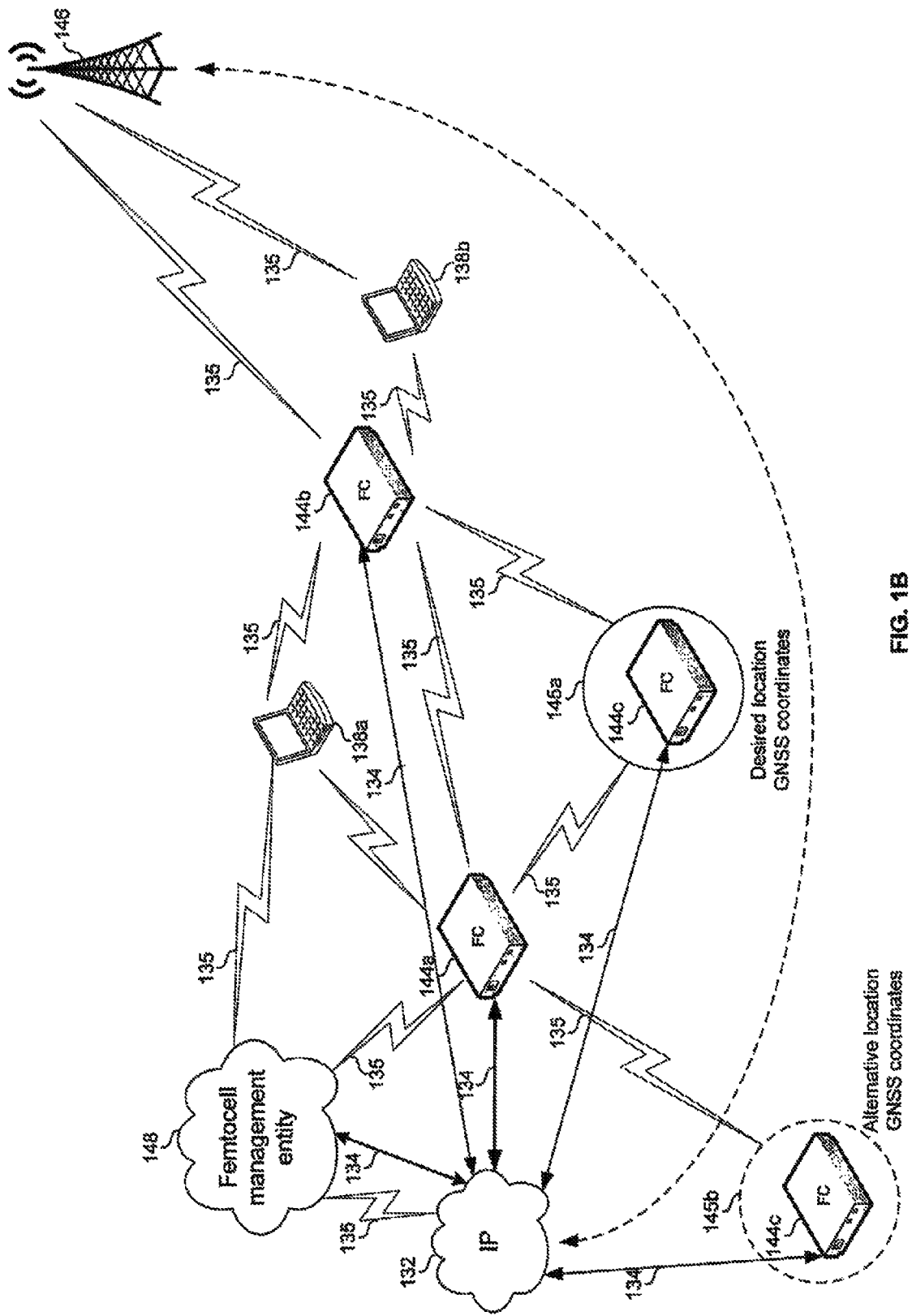
FIG. 1B is a diagram illustrating evaluating deployment of femtocells as part of a cellular network by a user, in accordance with an embodiment of the invention.

FIG. 1B is a diagram illustrating evaluating deployment of femtocells as part of a cellular network by a user, in accordance with an embodiment of the invention. Referring to FIG. 1B, there is shown a femtocell management entity 148, a plurality of installed femtocells 144*a* and 144*b*, a femtocell 144*c* that a user desires to install at either a desired location 145*a* or an alternative location 145*b*, cellular enabled communication devices 138*a* and 138*b*, collectively referred to herein as cellular enabled communication devices 138, and base station 146. The plurality of femtocells 144*a*, 144*b*, and 144*c* may be communicatively coupled to an IP network 132 via a wired connection 134. Notwithstanding, the invention may not be so limited, and other locations may be utilized for installation of the femtocell without limiting the scope of the invention.

The base station 146 may be similar to or the same as the base station 102 described with respect to FIG. 1A, for example. The cellular enabled communication devices 138 may be similar to or the same as the cellular enabled communication devices 112 described with respect to FIG. 1A, for example. The femtocells 144*a*, 144*b* and 144*c* may be similar to or the same as the femtocells 110 described with respect to FIG. 1A, for example.

The IP network 132 may comprise one or more network devices and/or network links operable to transmit and/or receive IP packets. The IP network 132 may provide access to the Internet and/or one or more private networks. The wired connection 134 may comprise a broadband link such as a digital subscriber line (DSL), a T1/E1 line, a cable television infrastructure, a satellite television infrastructure, and/or a satellite broadband Internet link. The wired connection 134 may comprise one or more optical, fiber, and/or wired links.

The cellular enabled device 138*a* and the cellular enabled device 138*b* may communicate via the femtocell 144*a* and 144*b*, the base station 146, and the IP network 132. For example, the cellular enabled device 138*a* may transmit data to the femtocell 144*a* utilizing one or more cellular standards. The femtocell 144*a* may packetize the data into one or more IP packets and the IP packets may be further encapsulated, encoded, modulated, or otherwise processed. The IP packets may then be routed via the IP network 132 to the base station 146. In some instances, the base station 146 may utilize IP backloading and the IP packets may be conveyed to the base station 146. In other instances, the IP packets may be transcoded via one or more network elements (not shown in FIG. 1B) to a format supported by the base station 146. The data may then be extracted from the IP packets, transcoded to a format suitable for cellular transmission, and subsequently transmitted to the cellular enabled device 138*b*. In accordance with another embodiment of the invention, a plurality of base stations may be part of a base station network and each of the plurality of base stations may be operable to communicate and receive data from the femtocell management entity 148 via the IP network 132.

In operation, the femtocell management entity 148 may be operable to receive one or more parameters, for example, potential interference, power levels, and/or directionality of antennas from the installed femtocells, for example, femtocell 144*a* and 144*b* and the plurality of cellular enabled communication devices 138*a* and 138*b*. The femtocell management entity 148 may be operable to receive the one or more parameters from the installed one or more femtocells, for example, femtocells 144*a* and 144*b* and the plurality of cellular enabled communication devices 138*a* and 138*b* or one or more base stations via a plurality of wireless connections 135. The wireless connection 135 may be enabled to communicate the one or more parameters wirelessly utilizing one or more of: IS-95, CDMA, GSM, TDMA, GPRS, EDGE, UMTS, WCDMA, OFDM, TD-SCDMA and/or HSDPA cellular standards.

In one embodiment of the invention, a user of the femtocell 144*c* may be enabled to enter global navigation system satellite (GNSS) coordinates of a desired location 145a for installation of the femtocell 144c. In another embodiment of the invention, the femtocell 144c may be operable to determine its location based on, for example, a GNSS receiver communicatively coupled to the femtocell 144c. In another embodiment of the invention, the femtocell 144c may be operable to determine its location based on assisted GNSS information that may be received from an assisted GNSS server. In accordance with another embodiment of the invention, the femtocell 144c may be operable to determine its location based on locations of other femtocells, such as 144a and 144b in the vicinity of the femtocell 144c. For example, the femtocell 144c may be operable to utilize one or more triangulation techniques, such as received signal strength, time of arrival (ToA), and/or angle of arrival (AoA) to determine its location.

Notwithstanding, the femtocell management entity 148 may be enabled to determine whether the desired location 145a is suitable for installation of the femtocell 144c based on a dynamically updated registry in the femtocell management entity 148 comprising the received parameters. If the desired location 145a is suitable for installation of the femtocell 144c, the femtocell 144c may be installed at the desired location 145a. If the desired location 145a is not suitable for installation of the femtocell 144c, the user may enter the GNSS coordinates of an alternative location 145b for installation of the femtocell 144c. The femtocell management entity 148 may be enabled to determine whether the alternative location 145b is suitable for installation of the femtocell 144c based on the dynamically updated registry. If the alternative location 145b is not suitable for installation of the femtocell 144c, the user may be prompted to select a new location by entering the GNSS coordinates of the new location for installation of the femtocell 144c. If the alternative location 145b is suitable for installation of the femtocell 144c, the femtocell 144c may be installed at the alternative location 145b. The femtocell management entity 148 may then receive the one or more parameters, for example, potential interference, power level, and/or directionality of antenna from the installed femtocell 144c subsequent to the installation of the femtocell 144c at the desired location 145a or alternative location 145b.

Figure 1C:
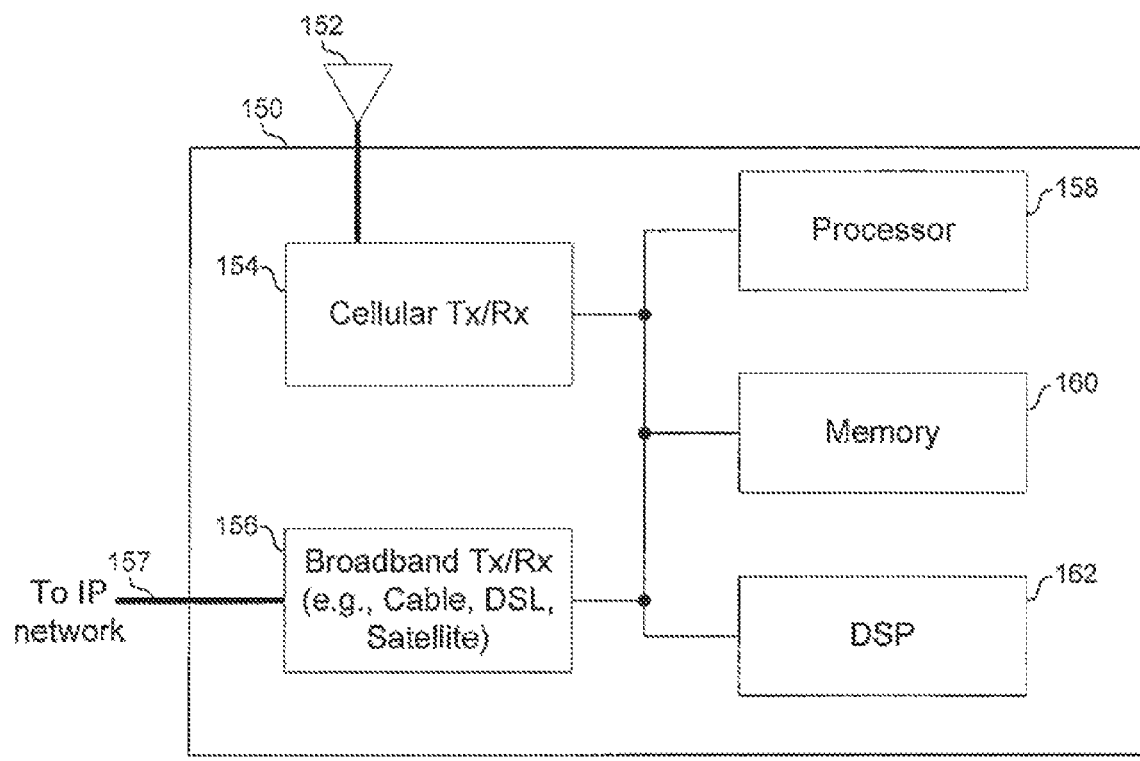
FIG. 1C is a block diagram of an exemplary femtocell, in accordance with an embodiment of the invention.

FIG. 1C is a block diagram of an exemplary femtocell, in accordance with an embodiment of the invention. Referring to FIG. 1C, there is shown a femtocell 150 comprising an antenna 152, a cellular transmitter and/or receiver (Tx/Rx) 154, a broadband transmitter and/or receiver (Tx/Rx) 156, a processor 158, a memory 160, and a digital signal processor (DSP) 162. The femtocell 150 may be similar to or the same as the femtocells 110 described with respect to FIG. 1B. The femtocell 150 may be part of a mesh network of interconnected femtocells.

The antenna 152 may be suitable for transmitting and/or receiving cellular signals. Although a single antenna is illustrated, the invention may not be so limited. In this regard, the cellular Tx/Rx 154 may utilize a common antenna for transmission and reception, or may utilize different antennas for transmission and reception, and/or may utilize a plurality of antennas for transmission and/or reception.

The cellular Tx/Rx 154 may comprise suitable logic circuitry and/or code that may be operable to transmit and/or receive voice and/or data utilizing one or more cellular standards. The cellular Tx/Rx 154 may be operable to perform amplification, down-conversion, filtering, demodulation, and analog to digital conversion of received cellular signals. The cellular Tx/Rx 154 may be operable to perform amplification, up-conversion, filtering, modulation, and digital to analog conversion of transmitted cellular signals. The cellular Tx/Rx 154 may support communication over a plurality of communication channels utilizing time division multiple access (TDMA), code division multiple access (CDMA) and/or orthogonal frequency division multiplexing (OFDM). Exemplary cellular standards supported by the femtocells 110 may be specified in the International Mobile Telecomunnications-2000 (IMT-2000) standard developed by the $3^{rd}$ generation partnership project (3GPP) and/or the $3^{rd}$ generation partnership project 2 (3GPP2). The cellular Tx/Rx 154 may be operable to transmit and/or receive on one or more frequencies and/or channels. One or more of the frequencies and/or one or more of the channels on which the cellular Tx/Rx 154 receives and/or transmits may be configured via one or more control signals from the processor 158, memory 160, and/or the DSP 162. The cellular Tx/Rx 154 may also comprise a processor that may be enabled to measure the received signal strength and for characterizing an environment in which the femtocell 150 resides.

The broadband Tx/Rx 156 may comprise suitable logic, circuitry, and/or code that may be operable to transmit voice and/or data in adherence to one or more broadband standards. The broadband Tx/Rx 156 may be operable to perform amplification, down-conversion, filtering, demodulation, and analog to digital conversion of received signals. The broadband Tx/Rx 156 may be operable to perform amplification, up-conversion, filtering, modulation, and digital to analog conversion of transmitted signals. In various exemplary embodiments of the invention, the broadband Tx/Rx 156 may transmit and/or receive voice and/or data over the link 157 which may be a T1/E1 line, optical fiber, DSL, cable television infrastructure, satellite broadband internet connection, satellite television infrastructure, and/or Ethernet. In various exemplary embodiments of the invention, data received via the broadband Tx/Rx 156 may be conveyed to the processor 158, memory 160, and/or the DSP 162 and may be utilized to control one or more frequencies, antenna direction, power levels, and/or channels on which the cellular Tx/Rx 154 transmits and/or receives.

The processor 158 may comprise suitable logic, circuitry, and/or code that may enable processing data and/or controlling operations of the femtocell 150. In this regard, the processor 158 may be enabled to provide control signals to the various other blocks comprising the femtocell 150. The processor 158 may also control data transfers between various portions of the femtocell 150. Additionally, the processor 158 may enable execution of applications programs and/or code. In various embodiments of the invention, the applications, programs, and/or code may enable, for example, parsing, transcoding, or otherwise processing data. In various embodiments of the invention, the applications, programs, and/or code may enable, for example, configuring or controlling operation of the cellular Tx/Rx 154, the broadband Tx/Rx 156, the DSP 162, and/or the memory 160. In various embodiments of the invention, the applications, programs, and/or code may enable detecting interference and/or controlling one or more frequencies and/or one or more channels on which the cellular Tx/Rx 154 transmits and/or receives.

In accordance with an embodiment of the invention, the processor 158 may be operable to communicate one or more parameters to the femtocell management entity 148. The femtocell management entity 148 may be operable to utilize the one or more parameters to determine configuration information for one of the plurality of femtocells, for example, femtocell 144c and/or for one or more remaining ones of the plurality of femtocells, for example, femtocells 144a. One of the plurality of femtocells, for example, femtocell 144c may be operable to receive the determined configuration information from the femtocell management entity 148. One of the plurality of femtocells, for example, femtocell 144c may be configured utilizing the received determined configuration information. The determined configuration information may comprise one or more of power levels, frequencies of operation, and/or directionality of antennas of each of the plurality of femtocells, for example, femtocells 144a, 144b, and 144c.

In accordance with an embodiment of the invention, subsequent to installation of the femtocell 110b, the processor 158 in the femtocell 110b may be operable to receive one or more parameters from the one or more installed femtocells, for example, femtocells 110a, 110c and 110d, base station 102 and the plurality of cellular enabled communication devices 112a and 112b from the cellular sub-network 101a. The processor 158 in the femtocell 110b may be operable to dynamically adjust one or more parameters based on the received one or more parameters, for example, power levels, potential interference, and/or directionality of antennas from the one or more installed femtocells, for example, femtocells 110a, 110c and 110d. The processor 158 in the femtocell 202b may be operable to receive the one or more parameters from the one or more installed femtocells, for example, femtocells 202a, 202c, 202d, 202e and 202f periodically.

The memory 160 may comprise suitable logic, circuitry, and/or code that may enable storage or programming of information that includes parameters and/or code that may effectuate the operation of the femtocell 150. The parameters may comprise configuration data and the code may comprise operational code such as software and/or firmware, but the information need not be limited in this regard. Moreover, the parameters may include adaptive filter and/or block coefficients. Additionally, the memory 160 may buffer or otherwise store received data and/or data to be transmitted. In various embodiments of the invention, the memory 160 may comprise one or more look-up tables utilized for determining cellular devices within a coverage area of the femtocell 150. In various embodiments of the invention, the memory 160 may comprise one or more look-up tables or other data structures which may comprise information controlling one or more frequencies and/or one or more channels on which the cellular Tx/Rx 154 transmits and/or receives.

The DSP 162 may comprise suitable logic, circuitry, and/or code operable to process audio and/or video signals. In various embodiments of the invention, the DSP 162 may encode, decode, modulate, demodulate, encrypt, and/or decrypt voice and/or data signals. In this regard, the DSP 162 may be operable to perform computationally intensive processing of voice and/or data signals. In various embodiments of the invention, the DSP 162 may be operable to detect interference and/or control one or more frequencies and/or one or more channels on which the cellular Tx/Rx 154 transmits and/or receives. The DSP 162 may be operable to perform, for example, fast Fourier transform analysis (FFT) of received signals to characterize radio environment in which the femtocell 150 resides.

The one or more frequencies and/or channels on which the cellular Tx/Rx 154 may transmit and/or receive may also be determined, at least in part, based on data received via the broadband Tx/Rx 156. In this regard, other femtocells and/or base stations may characterize the environment in which they are operating and may communicate results of those characterizations over, for example, an IP network to which the femtocell 150 is communicatively coupled. In various embodiments of the invention, characterizing an environment may comprise measuring one or more parameters, such as measuring signal strengths on one or more frequencies and/or channels to determine potential interference with other installed femtocells, measuring power levels, measuring directionality of antennas and communicating the measured parameters to a femtocell management entity 148 for processing. In this manner, signals which may interfere with cellular communications with the femtocell 150 may be detected.

In operation, information may be exchanged, via the broadband Tx/Rx 156, between the femtocell 150 and a femtocell management entity. The exchanged information may be communicated utilizing, for example, the Internet Protocol (IP). The exchanged information may enable managing access to the femtocell 150 by one or more cellular enabled communication devices. Information may be exchanged between the femtocell 150 and the femtocell management entity via the broadband TxRx 156. The information from the femtocell management entity 148 may update one or more tables, lists, databases, or other data structures within the femtocell 150 that may determine permissions and/or track usage and/or billing for cellular enabled communication devices. In some embodiments of the invention, a cellular enabled communication device may connect to the femtocell management entity via a reserved channel provided by the cellular Tx/Rx 154. In this regard, data destined for the femtocell management entity from a cellular communication device may be received at the cellular Tx/Rx 154 which may down-convert, de-capsulate, and/or otherwise process the data. Additionally, the processor 158, memory 160, and/or DSP 162 may process the data prior to conveying the data to the broadband Tx/Rx 156. The broadband Tx/Rx 156 may then encapsulate, up-convert, and/or otherwise process the data and transmit the data to the femtocell management entity. Similarly, data destined for a cellular communication device from the femtocell management entity may be received at the broadband Tx/Rx 156 which may down-convert, de-capsulate, and/or otherwise process the data. Additionally, the processor 158, memory 160, and/or DSP 162 may process the data prior to conveying the data to the cellular Tx/Rx 154. The cellular Tx/Rx 154 may then encapsulate, up-convert, and/or otherwise process the data and transmit the data to the cellular enabled communication device.

Figure 2:
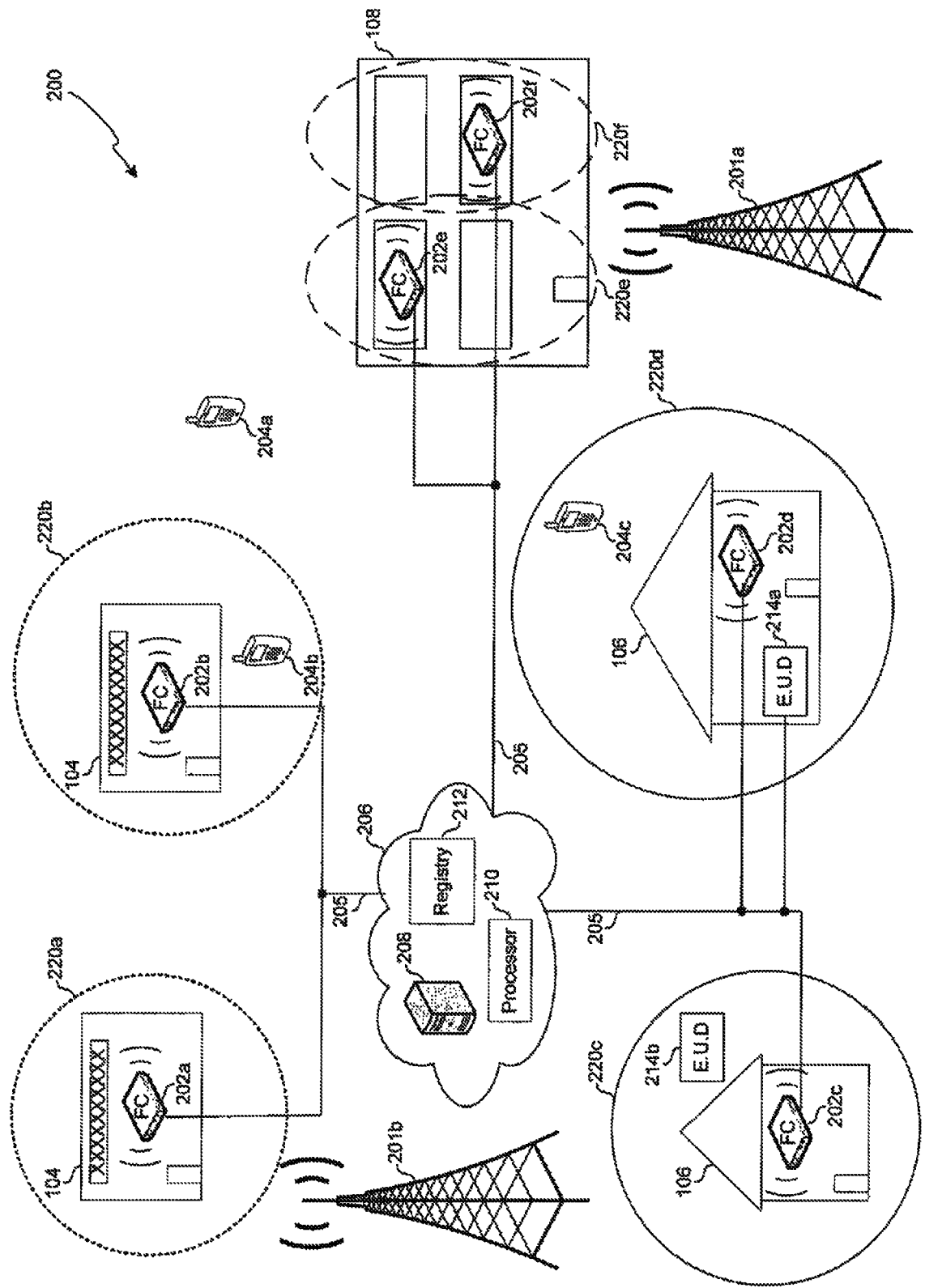
FIG. 2 is a diagram illustrating a geographic area comprising a plurality of femtocells managed via a management entity, in accordance with an embodiment of the invention.

FIG. 2 is a diagram illustrating a geographic area comprising a plurality of femtocells managed via a management entity, in accordance with an embodiment of the invention. Referring to FIG. 2, there is shown a communication system 200. The communication system 200 may comprise a plurality of commercial properties 104, residential properties 106, multi-tenant properties 108, a plurality of base stations 201a and 201b, a plurality of installed femtocells 202a, 202c, 202d, 202e and 202f, a femtocell 202b that needs to be installed, a plurality of cellular enabled communication devices 204a, 204b and 204c, end-user communication devices 214a and 214b, and a femtocell management entity 206.

The commercial properties 104, the residential properties 106, and the multi-tenant properties 108 may be substantially as described with respect to FIG. 1A. The cellular enabled communication devices 204a, 204b, and 204c may be similar to or the same as the cellular enabled communication devices 112a and 112b (FIG. 1A) and/or 138a and 138b (FIG. 1B). Exemplary cellular enabled communication devices comprise cell phones and laptops with a cellular data card. In some instances, the cellular enabled communication devices 204a, 204b, and 204c may be enabled to communicate with the femtocell management entity 206.

Each of the end-user communication devices 214a and 214b may comprise one or more of a cellular enabled communication device, similar to or the same as the devices 204a, 204b, and 204c, a wireless communication device such as a Bluetooth and/or Wi-Fi enabled device, and/or a wired communication device such as a computer with an Ethernet port. The end-user communication device 214a and 214b may be operable to communicate with the femtocell management entity 206.

The plurality of femtocells 202a, 202b, 202c, 202d, 202e and 202f, which are collectively referred to as femtocells 202, may be similar to or the same as the femtocells 110 (FIG. 1A), 144 (FIG. 1B), and/or 150 (FIG. 1C). The femtocells 202 may each be enabled to communicate with the femtocell management entity 206 via a wired connection, for example, an IP connection and/or a wireless connection.

The plurality of femtocells 202a, 202b, 202c, 202d, 202e and 202f may be established via the femtocell management entity 206. The femtocell management entity 206 may comprise suitable logic, circuitry, and/or code for managing operating parameters of one more installed femtocells 202a, 202c, 202d, 202e and 202f. In various embodiments of the invention, the femtocell management entity 206 may comprise an application specific device or plurality of devices. Alternatively, the femtocell management entity 206 may reside on and/or be enabled by one or more servers 208, a processor 210 and a registry 212, which may manage various parameters of communication channels over which the femtocells 202 may communicate. For example, the femtocell management entity 206 may comprise one or more web pages, databases, and/or web based applications which may be accessed via an IP network. In determining values for the various parameters, the femtocell management entity 206 may utilize feedback received from the femtocells 202. After determining the parameter values, the femtocell management entity 206 may communicate the determinations to the femtocells 202.

In accordance with an embodiment of the invention, the processor 210 in the femtocell management entity 206 may be operable to receive one or more parameters from one or more installed femtocells, for example, femtocells 202a, 202c, 202d, 202e and 202f. The processor 210 may be operable to determine a location for installation of a femtocell, for example, femtocell 202b in a vicinity of the one or more installed femtocells, for example, femtocells 202a, 202c, 202d, 202e and 202f based on the received one or more parameters. The received one or more parameters may comprise one or more of potential interference, power levels, and/or directionality of antennas of the one or more installed femtocells, for example, femtocells 202a, 202c, 202d, 202e and 202f. In accordance with another embodiment of the invention, one or more femtocells may function as a management entity 206. The one or more parameters may be communicated from one of the other of the plurality of femtocells to the femtocell functioning as a management entity 206. The femtocell functioning as a management entity 206 may be enabled to utilize the one or more parameters to determine configuration information for one of the other of the plurality of femtocells and/or for one or more remaining ones of the plurality of femtocells.

The processor 210 may be operable to dynamically update a registry 212 at the femtocell management entity 206 based on the received one or more parameters from the one or more installed femtocells, for example, femtocells 202a, 202c, 202d, 202e and 202f, one or more base stations 201a and 201b, and/or the one or more cellular enabled communication devices, for example, 204a, 204b and 204c in the vicinity of the determined location 220b for the installation of the femtocell 202b. The dynamically updated registry 212 may comprise one or more global navigation system satellite (GNSS) coordinates, an identification number and/or a list of the one or more parameters of each of the one or more installed femtocells, for example, femtocells 202a, 202c, 202d, 202e and 202f. For example, the registry 212 may comprise the GNSS coordinates 220a of femtocell 202a, GNSS coordinates 220c of femtocell 202c, GNSS coordinates 220d of femtocell 202d, GNSS coordinates 220e of femtocell 202e and GNSS coordinates 220f of femtocell 202f.

The femtocell management entity 206 may be operable to enable a user to determine whether a particular location is suitable for the installation of femtocell 202b based on one or more GNSS coordinates of the desired location for installation of the femtocell 202b. The femtocell management entity 206 may be operable to receive the one or more parameters, for example, potential interference, power level, and/or directionality of antenna from the femtocell 202b subsequent to the installation of the femtocell 202b at the determined location.

In accordance with an embodiment of the invention, subsequent to installation of the femtocell 202b by a user, the femtocell 202b may be operable to measure interference from neighboring femtocells, for example, femtocells 202a, 202c, 202d, 202e and 202f. The femtocell management entity 206 may be operable to adjust one or more parameters of the femtocells, for example, femtocells 202a, 202c, 202d, 202e and 202f to accommodate installation of the femtocell 202b at the desired location 220b. In this regard, power levels and/or directionality of the neighboring femtocells may be adjusted.

In accordance with an embodiment of the invention, subsequent to installation of the femtocell 202b by a user, on or more processors, for example, processor 158 in the femtocell 202b may be operable to receive one or more parameters from the one or more installed femtocells, for example, femtocells 202a, 202c, 202d, 202e and 202f. The processor 158 in the femtocell 202b may be operable to dynamically adjust one or more parameters based on the received one or more parameters from the one or more installed femtocells, for example, femtocells 202a, 202c, 202d, 202e and 202f to accommodate installation of the femtocell 202b at the determined location 220b. The processor 158 in the femtocell 202b may be operable to receive the one or more parameters from the one or more installed femtocells, for example, femtocells 202a, 202c, 202d, 202e and 202f periodically.

In accordance with an embodiment of the invention, the femtocell management entity 206 may be operable to communicate test parameters to each of the plurality of femtocells, for example, femtocells 202a, 202b, 202c, 202d, 202e and 202f. The test parameters may comprise particular frequencies of operation, particular directions of antennas and/or particular power levels, for example. The test parameters may be based on performance information received from the new femtocell 202b and the neighboring femtocells, for example, femtocells 202a, 202c, 202d, 202e and 202f. The test parameters may be updated based on updated information received from the plurality of femtocells for example, femtocells 202a, 202b, 202c, 202d, 202e and 202f. In accordance with another embodiment of the invention, one or more parameters may be communicated from one of the plurality of femtocells, for example, femtocell 202b to the femtocell management entity 206. The one or more parameters may comprise one or more of signal to noise ratio (SNR), signal to interference noise ratio (SINR), carrier to noise ratio (CNR), carrier to interference noise ratio (CINR), receive signal strength indication (RSSI), potential interference, power levels, and/or directionality of antennas of the plurality of femtocells. The antennas may be one or more of electronically steerable antennas, switched beam antennas and/or multiple antenna arrays, for example. Accordingly, the plurality of femtocells may be operable to scan a plurality of directions utilizing the one or more antennas and communicate the one or more parameters to the femtocell management entity 206.

The femtocell management entity 206 may be operable to utilize the one or more parameters to determine configuration information for one of the plurality of femtocells, for example, femtocell 202b and/or for one or more remaining ones of the plurality of femtocells, for example, femtocells 202a and 202e. The determined configuration information may comprise one or more of power levels, frequencies of operation, and/or directionality of antennas of each of the plurality of femtocells, for example, femtocells 202a, 202b, 202c, 202d, 202e and 202f. One of the plurality of femtocells, for example, femtocell 202b may be operable to receive the determined configuration information from the femtocell management entity 206. One of the plurality of femtocells, for example, femtocell 202b may be configured utilizing the received determined configuration information.

The femtocell management entity 206 may be operable to communicate the determined configuration information for one or more remaining ones of the plurality of femtocells, for example, femtocells 202a and 202e to corresponding ones of one or more remaining ones of the plurality of femtocells, for example, femtocells 202a and 202e. One of the plurality of femtocells, for example, femtocell 202b may be operable to communicate one or more updated parameters from one of the plurality of femtocells, for example, femtocell 202b to the femtocell management entity 206. The femtocell management entity 206 may be operable to utilize the one or more updated parameters to determine new configuration information for one of the plurality of femtocells, for example, femtocell 202b and/or for one or more remaining ones of the plurality of femtocells, for example, femtocells 202a and 202e. One of the plurality of femtocells, for example, femtocell 202b may be operable to receive from the femtocell management entity 206, the determined new configuration information for one of the plurality of femtocells, for example, femtocell 202b. The femtocell management entity 206 may be operable to communicate the determined new configuration information for the one or more remaining ones of the plurality of femtocells, for example, femtocells 202a and 202e to corresponding ones of the one or more remaining ones of the plurality of femtocells, for example, femtocells 202a and 202c.

In various embodiments of the invention, a femtocell may exchange information with the femtocell management entity 206 without intervention from a user, and may automatically update settings or other information stored on the femtocell and/or stored on the servers of the femtocell management entity 206.

FIG. 3 is a diagram illustrating an exemplary registry in a femtocell management entity, in accordance with an embodiment of the invention. Referring to FIG. 3, the registry 350 comprises a plurality of femtocell entries 334a, 334b, and 334c, collectively referred to herein as entries 334. Although only three entries 334 are depicted, the invention may not be so limited and any number of entries may be displayed and/or scrollable in the registry 350. Each entry 334 may comprise a name/description field 336, a femtocell identification field 338, a GNSS coordinates field 340, a distance field 342, an antenna direction field 344, a potential interference field 346, and a power level field 348.

The name/description field 336 may provide information to uniquely describe a femtocell. The femtocell identification field 338 may comprise information such as make, model, and serial number of a femtocell. Additionally or alternatively, the femtocell identification field 338 may comprise an alphanumeric identifier assigned to a femtocell by the femtocell's owner/operator. In some embodiments of the invention, the femtocell identification field 338 may comprise a unique key or number similar to or the same as an international mobile subscriber identity (IMSI) utilized by GSM and UMTS cellular networks.

The GNSS coordinates field 340 may indicate the current GNSS coordinates of an installed femtocell. The distance field 342 may indicate a distance of the end-user communication device 214 from a femtocell, for example. The distance field 342 along with the GNSS coordinates field 340 may enable a user of the end-user communication device 214 to locate and move into a coverage area of a femtocell.

The antenna direction field 344 may indicate the current direction of the antenna in the installed femtocell. The potential interference field 346 may indicate the level of potential interference expected when a new femtocell is installed in a vicinity of the installed femtocell. The power levels field 348 may indicate the power level of the installed femtocell.

In an exemplary embodiment of the invention, the plurality of parameters in the registry 350 may be dynamically updated based on receiving one or more of the parameters from the plurality of installed femtocells and the plurality of cellular enabled communication devices in the vicinity of the location for the installation of the femtocell. The parameters may be communicated to the registry 350 and the configuration information may be received by the plurality of femtocells from the femtocell management entity 206 via a wireless connection 135. Once the registry 350 is updated, the updated information may be utilized to determine new configuration information for the installed femtocell. The installed femtocell may utilize the new configuration information to adjust one or more of its parameters, for example, power levels, frequencies of operation and/or directionality of antennas. The registry 350 may also be updated manually by an operator.

Figure 4:
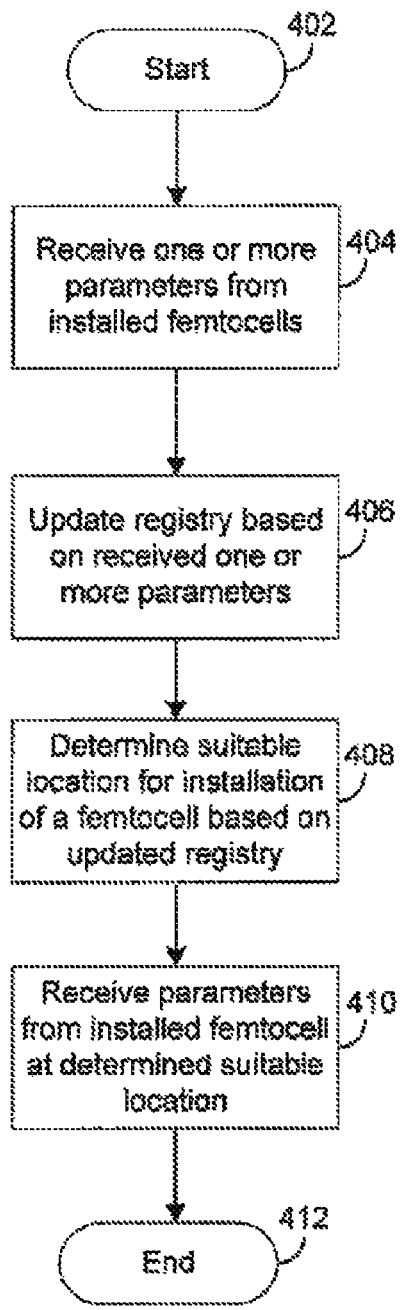
FIG. 4 is a flow chart illustrating exemplary steps for evaluating deployment of femtocells as part of a cellular network by a management entity, in accordance with an embodiment of the invention.

FIG. 4 is a flow chart illustrating exemplary steps for evaluating deployment of femtocells as part of a cellular network by a service provider, in accordance with an embodiment of the invention. Referring to FIG. 4, exemplary steps may begin at step 402. In step 404, a femtocell management entity may receive one or more parameters, such as potential interference, power levels, and/or directionality of antennas from one or more installed femtocells and one or more cellular enabled communication devices in the vicinity of the location for the installation of the femtocell. In step 406, a registry at the femtocell management entity may be dynamically updated based on the received one or more parameters. In step 408, a suitable location for installation of a femtocell may be determined based on the dynamically updated registry. In step 410, the femtocell management entity may be enabled to receive the one or more parameters, for example, potential interference, power level, and/or directionality of antenna from the installed femtocell subsequent to the installation of the femtocell at the determined location. Control then passes to end step 412.

Figure 5:
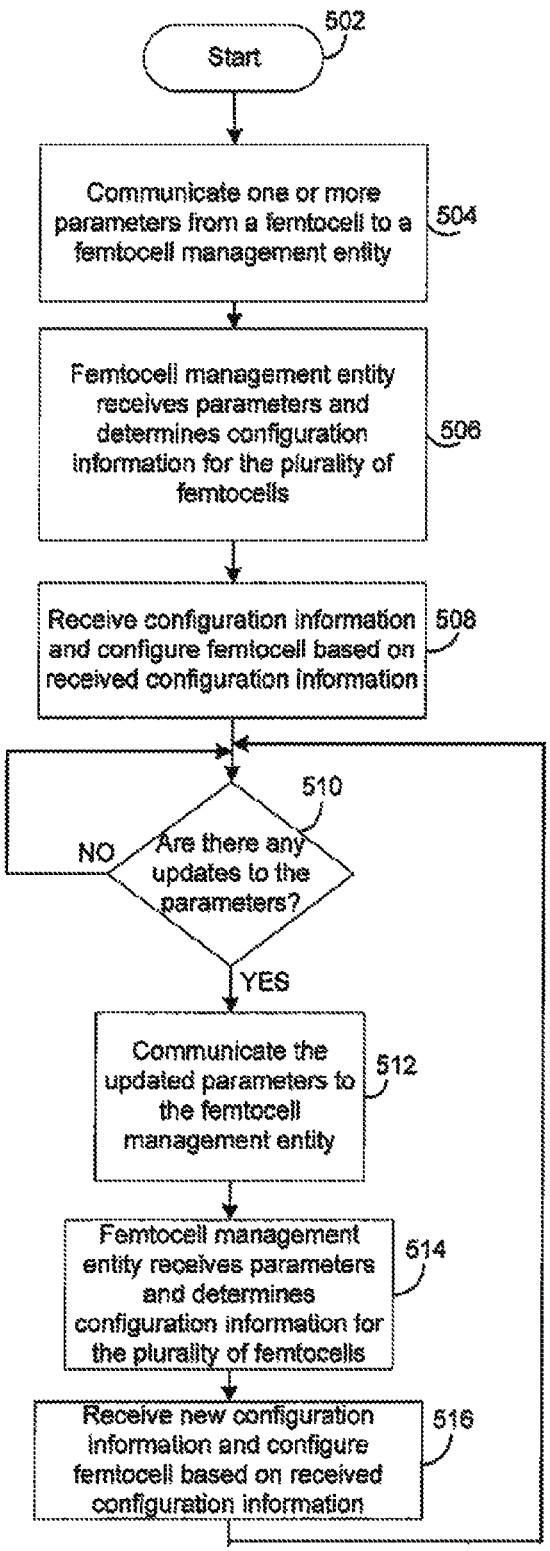
FIG. 5 is a flow chart illustrating exemplary steps for configuration of one or more femtocells in a femtocell network, in accordance with an embodiment of the invention.

FIG. 5 is a flow chart illustrating exemplary steps for configuration of one or more femtocells in a femtocell network, in accordance with an embodiment of the invention. Referring to FIG. 5, exemplary steps may begin at step 502. In step 504, one or more parameters may be communicated from one of the plurality of femtocells to the femtocell management entity. In step 506, the femtocell management entity may be operable to utilize the one or more parameters to determine configuration information for one of the plurality of femtocells and/or for one or more remaining ones of the plurality of femtocells. In step 508, the plurality of femtocells may be operable to receive the determined configuration information from the femtocell management entity and configure the plurality of femtocells utilizing the received determined configuration information.

In step 510, it may be determined whether there are any updates to one or more communicated parameters in each of the plurality of femtocells. In instances where, one or more communicated parameters have not been updated, control returns to step 510. In instances where, one or more communicated parameters have been updated, control passes to step 512. In step 512, one of the plurality of femtocells may be operable to communicate one or more updated parameters to the femtocell management entity. In step 514, the femtocell management entity may be operable to utilize the one or more updated parameters to determine new configuration information for one of the plurality of femtocells, and/or for one or more remaining ones of the plurality of femtocells. In step 516, the plurality of femtocells may be operable to receive the determined new configuration information from the femtocell management entity and configure the plurality of femtocells utilizing the received new configuration information. Control then returns to step 510.

In accordance with an embodiment of the invention, a method and system for dynamic adjustment of power, antenna direction and frequencies in a femtocell network may comprise a communication system 200. The communication system 200 may comprise a plurality of femtocells, for example, femtocells 202a, 202b, 202c, 202d, 202e and 202f, one or more base stations 201a and 201b, and a femtocell management entity 206 that may coordinate operation of the plurality of femtocells, for example, femtocells 202a, 202b, 202c, 202d, 202e and 202f. One or more parameters may be communicated from one of the plurality of femtocells, for example, femtocell 202b and/or one or more base stations 201a and 201b to the femtocell management entity 206. In accordance with an embodiment of the invention, one or more of the plurality of femtocells 202a, 202b, 202c, 202d, 202e and 202f may share a frequency channel or band with one or more base stations 201a and 201b, for example. The femtocell management entity 206 may be operable to utilize the one or more parameters to determine configuration information for one of the plurality of femtocells, for example, femtocell 202b and/or for one or more remaining ones of the plurality of femtocells, for example, femtocells 202a and 202c. One of the plurality of femtocells, for example, femtocell 202b may be operable to receive the determined configuration information from the femtocell management entity 206. One of the plurality of femtocells, for example, femtocell 202b may be configured utilizing the received determined configuration information.

The femtocell management entity 206 may be operable to communicate the determined configuration information for one or more remaining ones of the plurality of femtocells, for example, femtocells 202a and 202c to corresponding ones of one or more remaining ones of the plurality of femtocells, for example, femtocells 202a and 202c. One of the plurality of femtocells, for example, femtocell 202b may be operable to communicate one or more updated parameters from one of the plurality of femtocells, for example, femtocell 202b to the femtocell management entity 206. The femtocell management entity 206 may be operable to utilize the one or more updated parameters to determine new configuration information for one of the plurality of femtocells, for example, femtocell 202b and/or for one or more remaining ones of the plurality of femtocells, for example, femtocells 202a and 202c. One of the plurality of femtocells, for example, femtocell 202b may be operable to receive from the femtocell management entity 206, the determined new configuration information for one of the plurality of femtocells, for example, femtocell 202b. The femtocell management entity 206 may be operable to communicate the determined new configuration information for the one or more remaining ones of the plurality of femtocells, for example, femtocells 202a and 202c to corresponding ones of the one or more remaining ones of the plurality of femtocells, for example, femtocells 202a and 202c.

The one or more parameters may comprise one or more of signal to noise ratio (SNR), signal to interference noise ratio (SINR), carrier to noise ratio (CNR), carrier to interference noise ratio (CINR), receive signal strength indication (RSSI), potential interference, power levels, and/or directionality of antennas of said plurality of femtocells. The determined configuration information may comprise one or more of power levels, frequencies of operation, and/or directionality of antennas of each of the plurality of femtocells, for example, femtocells 202a, 202b, 202c, 202d, 202e and 202f.

The femtocell management entity 206 may comprise a registry 212 that may be updated based on the communicated one or more parameters. The registry 212 may comprise one or more of global navigation system satellite (GNSS) coordinates, an identification number and/or a list of the one or more parameters for each of the plurality of femtocells, for example, femtocells 202a, 202b, 202c, 202d, 202e and 202f within the communication system 200. The one or more parameters may be communicated via a wireless connection 205. The wireless connection 205 may be operable to handle signals comprising IS-95, CDMA, GSM, TDMA, GPRS, EDGE, UMTS, WCDMA, OFDM, TD-SCDMA and/or HSDPA signals. Notwithstanding, the invention may not be so limited, and the femtocell management entity 206 may be operable to communicate data to the plurality of femtocells via a wired network 134, for example, a digital subscriber line (DSL) connection, fiber connection, and/or a cable connection without limiting the scope of the invention.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for dynamic adjustment of power, antenna direction and frequencies in a femtocell network.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
one or more circuits and/or processors for use in a femtocell configured to:
receive a directionality of antennas of one or more of a plurality of femtocells, base stations, and cellular enabled communication devices, and one or more parameters from one of the plurality of femtocells, base stations, and cellular enabled communication devices;
determine configuration information utilizing the directionality of antennas and the one or more parameters; and
communicate configuration information to the one or more of the plurality of femtocells.

2. The system of claim 1, wherein the one or more circuits and/or processors are further configured to:
dynamically adjust the femtocell based on the received one or more parameters and the directionality of antennas.

3. The system of claim 1, wherein the one or more circuits and/or processors are further configured to:
receive the directionality of antennas and the one or more parameters periodically.

4. The system according to claim 1, wherein the one or more circuits and/or processors are configured to communicate the configuration information via a wireless connection.

5. The system according to claim 4, wherein the wireless connection comprises one or more of:
Interim Standard 95 (IS-95);
Code Division Multiple Access (CDMA);
Global System for Mobile Communications (GSM);
Time Division Multiple Access (TDMA);
General Packet Radio Service (GPRS);
Enhanced Data Rates for GSM Evolution (EDGE);
Universal Mobile Telecommunications System (UMTS);
Wideband Code Division Multiple Access (WCDMA);
Time Division Synchronous Code Division Multiple Access (TD-SCDMA); and
High-Speed Downlink Packet Access (HSDPA) standards.

6. The system of claim 1, wherein the one or more circuits and/or processors are further configured to:
determine location information of another femtocell based on at least one of: assisted global navigation system satellite (GNSS) information and locations of the one or more of the plurality of femtocells.

7. The system of claim 6, wherein the one or more circuits and/or processors are further configured to:
determine location information based on locations of the one or more of the plurality of femtocells, utilizing triangulation techniques including at least one of: received signal strength, time of arrival (ToA), and angle of arrival (AoA).

8. The system of claim 1, wherein the one or more circuits and/or processors are further configured to:
determine location information of another femtocell based on data in a registry dynamically updated with the received directionality of antennas and the one or more parameters.

9. The system of claim 8, wherein the registry comprises an entry for the one or more of the plurality of femtocells, comprising at least one of:
a femtocell identification, a GNSS coordinate, a distance of an end-user communication device to a femtocell, an antenna direction, a potential interference, and a power level.

10. The system of claim 8, wherein the one or more circuits and/or processors are further configured to:
receive directionality of antennas and one or more parameters from the another femtocell.

11. The system of claim 10, wherein the one or more circuits and/or processors are further configured to:
determine new configuration information utilizing the directionality of antennas and the one or more parameters from the another femtocell; and
communicate new configuration information to at least one of: the one or more of the plurality of femtocells and the another femtocell.

12. The system of claim 1, wherein the one or more circuits and/or processors are further configured to:
receive new global navigation system satellite (GNSS) coordinates of another femtocell; and
determine whether a location of the another femtocell based on the new GNSS coordinates is suitable.

13. The system of claim 1, wherein the one or more parameters comprises at least one of a signal to noise ratio (SNR), a signal to interference noise ratio (SINR), a carrier to noise ratio (CNR), a carrier to interference noise ratio (CINR), a receive signal strength indication (RSSI), a potential interference, or a power level of the one or more of the plurality of femtocells.

14. The system of claim 1, wherein the configuration information comprises at least one of: power levels, frequencies of operation, or directionality of antennas of the one or more of the plurality of femtocells.

15. The system of claim 1, wherein the one or more circuits and/or processors are further configured to:
transmit information to update at least one table, list, database, or other data structure in the one or more of the plurality of femtocells and/or the femtocell, to determine permission, and/or track usage, and/or billing for a cellular enabled communication device to access to the one or more of the plurality of femtocells and/or the femtocell.

16. A method for a femtocell, the method comprising:
receiving a directionality of antennas of one or more of a plurality of femtocells and one or more parameters from the one or more of the plurality of femtocells;
determining configuration information utilizing the directionality of antennas and the one or more parameters; and
communicating configuration information to the one or more of the plurality of femtocells,
wherein one or more of the receiving, determining, and communicating is executed by a processor.

17. The method of claim 16, comprising:
dynamically adjusting the femtocell based on the received one or more parameters and the directionality of antennas.

18. The method of claim 16, comprising:
receiving the one or more parameters and the directionality of antennas periodically.

19. The method of claim 16, wherein the one or more parameters comprises at least one of:
   signal to noise ratio (SNR), signal to interference noise ratio (SINR), carrier to noise ratio (CNR), carrier to interference noise ratio (CINR), receive signal strength indication (RSSI), potential interference, or power levels of the plurality of femtocells.

20. The method of claim 16, wherein the configuration information comprises one or more of: power levels, frequencies of operation, or directionality of antennas of the one or more of the plurality of femtocells.

* * * * *

UNITED STATES PATENT AND TRADEMARK OFFICE
CERTIFICATE OF CORRECTION

| | | |
|---|---|---|
| PATENT NO. | : 8,761,752 B2 | Page 1 of 1 |
| APPLICATION NO. | : 13/890006 | |
| DATED | : June 24, 2014 | |
| INVENTOR(S) | : Erceg et al. | |

It is certified that error appears in the above-identified patent and that said Letters Patent is hereby corrected as shown below:

In the Claims

<u>Column 18, line 31, claim 13</u>
Please replace "one of a" with --one of: a--.

Signed and Sealed this
Thirtieth Day of September, 2014

Michelle K. Lee
*Deputy Director of the United States Patent and Trademark Office*